(12) United States Patent
Fujimoto

(10) Patent No.: US 10,094,076 B2
(45) Date of Patent: Oct. 9, 2018

(54) SURVEYING INSTRUMENT, SURVEYING INSTRUMENT USAGE METHOD, AND CONSTRUCTION MACHINE CONTROL SYSTEM

(71) Applicant: TOPCON CORPORATION, Tokyo (JP)

(72) Inventor: Masanori Fujimoto, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 15/421,980

(22) Filed: Feb. 1, 2017

(65) Prior Publication Data

US 2017/0226708 A1 Aug. 10, 2017

(30) Foreign Application Priority Data

Feb. 9, 2016 (JP) .................................. 2016-022547

(51) Int. Cl.
| | | |
|---|---|---|
| *E01C 19/00* | (2006.01) | |
| *G01C 1/00* | (2006.01) | |
| *G01C 25/00* | (2006.01) | |
| *G01C 5/00* | (2006.01) | |
| *G06F 19/00* | (2018.01) | |

(52) U.S. Cl.
CPC .............. *E01C 19/004* (2013.01); *G01C 1/00* (2013.01); *G01C 5/00* (2013.01); *G01C 25/00* (2013.01)

(58) Field of Classification Search
CPC .. G01C 1/00; G01C 5/00; G01C 25/00; E01C 19/004
USPC .................................... 701/49, 50; 172/4.5, 9
See application file for complete search history.

(56) References Cited

U.S. PATENT DOCUMENTS

| | | | |
|---|---|---|---|
| 9,341,500 B2* | 5/2016 | Lippuner | ........... G01D 5/24452 |
| 2004/0107586 A1* | 6/2004 | Nakamura | ......... G01D 5/24452 33/1 PT |
| 2006/0191148 A1* | 8/2006 | Lippuner | ................. G01C 1/02 33/290 |
| 2014/0074295 A1 | 3/2014 | Kumagai et al. | |

FOREIGN PATENT DOCUMENTS

JP 2014055499 A 3/2014

* cited by examiner

*Primary Examiner* — Gertrude Arthur Jeanglaude
(74) *Attorney, Agent, or Firm* — Roberts Mlotkowski Safran Cole & Calderon, P.C.

(57) ABSTRACT

It is premised that a surveying instrument at least includes an elevation angle measuring part 30 measuring an elevation angle relative to an object to be measured. Under this premise, the surveying instrument includes an error detecting part 35, 54, 55 detecting a vertical-axis error $\Delta\theta$ reflected in an elevation angle measured by the elevation angle measuring part 30 and a correction processing part 50 receiving an elevation angle measured by the elevation angle measuring part 30 and outputting as an elevation angle an angle acquired by cancelling the vertical-axis error $\Delta\theta$ detected by the error detecting part 35, 54, 55 form the elevation angle.

8 Claims, 11 Drawing Sheets

SURVEYING INSTRUMENT, SURVEYING INSTRUMENT USAGE METHOD, AND CONSTRUCTION MACHINE CONTROL SYSTEM

BACKGROUND OF THE INVENTION

1. Field of the Invention

The present invention relates to a surveying instrument, a surveying instrument usage method, and a construction machine control system.

2. Description of the Related Art

In some construction machine control systems, a surveying instrument measures position information of a construction machine and transmits the position information to the construction machine, and the construction machine controls itself by utilizing the position information. For example, Japanese Laid-Open Patent Publication No. 2014-55499 proposes a system utilizing a slip form paving machine performing continuous pavement with a concrete slab and a surveying instrument to achieve a slip form construction method. In the slip form construction method, a steel form (mold) is attached to a molding machine and concrete is put into the mold for compaction molding while the molding machine is advanced to continuously construct a structure with the same cross section, and the surveying instrument continuously measures the position information of the slip form paving machine and continuously transmits the position information to the slip form paving machine while the slip form paving machine utilizes the position information transmitted from the surveying instrument to provide a height control of a concrete placement surface.

In road pavement construction using the slip form construction method, it is required to keep a finished surface height accuracy within several mm so as to accurately construct inclination etc. of a road surface. Therefore, to improve the finished surface height accuracy, a measurement accuracy must be increased in the surveying instrument and, to increase the measurement accuracy, the presence of a mechanical error in the surveying instrument must be taken into consideration to check and adjust the accuracy.

However, the checking and adjustment of accuracy of the surveying instrument are performed only in a factory or a place in which the checking and adjustment can be performed, and such measures have limitations in terms of timeliness and work efficiency. Therefore, it is not easy to always maintain the measurement accuracy of the surveying instrument high at the measurement timing.

SUMMARY OF THE INVENTION

The present invention was conceived in view of the situations and a first object thereof is to provide a surveying instrument capable of easily outputting measurement information prevented as much as possible from reflecting a mechanical error without particular checking and adjustment of accuracy.

A second object is to provide a surveying instrument usage method using the surveying instrument.

A third object is to provide a construction machine control system utilizing the surveying instrument.

To achieve the first object, the present invention has configurations as described in (1) to (4).

(1) A surveying instrument at least having an angle measuring part measuring an angle relative to an object to be measured is configured to comprise an error detecting part detecting a mechanical error reflected in a measurement angle measured by the angle measuring part; and a correction processing part receiving a measurement angle measured by the angle measuring part and outputting as a measurement angle an angle acquired by cancelling the mechanical error detected by the error detecting part from the measurement angle.

According to this configuration, even when the surveying instrument has a mechanical error, the error detecting part detects the mechanical error and the correction processing part automatically cancels the mechanical error from the measurement angle measured by the angle measuring part. Therefore, the surveying instrument can acquire as a measurement angle an angle prevented as much as possible from reflecting the mechanical error of the surveying instrument at the measurement timing and accordingly can easily output measurement information including the measurement angle prevented as much as possible from reflecting the mechanical error without particular checking and adjustment of accuracy.

(2) Under the configuration of (1), the angle measuring part is an elevation angle measuring part measuring an elevation angle relative to an object to be measured, and the error detecting part detects a mechanical error affecting an elevation angle defined as the measurement angle.

According to this configuration, an angle prevented as much as possible from reflecting the mechanical error can be acquired as the elevation angle relative to the object to be measured without particular checking and adjustment of accuracy. As a result, an error in the up-down direction can be eliminated as much as possible in the position information of the object to be measured and, if movement control is provided in the up-down direction in the object to be measured, the control accuracy can be increased.

(3) Under the configuration of (1), the surveying instrument is configured to comprise a driving part freely changing and adjusting a measurement posture, an initial posture instructing part instructing the driving part to sequentially take a normal posture form and a reverse posture form for acquiring installation position information on the condition that a start switch is activated, an initial posture determining part determining the normal posture form and the reverse posture form taken based on the instruction from the initial posture instructing part, the initial posture determining part instructing the error detecting part to detect the mechanical error at the time of the normal posture form and at the time of the reverse posture form, and an error calculating part calculating a representative mechanical error from a mechanical error at the time of the normal posture form and a mechanical error at the time of the reverse posture form detected by the error detecting part.

According to this configuration, a step for acquiring a mechanical error can be incorporated in an installation position information acquisition work at the time of use of the surveying instrument, so that the need for independently providing the step for acquiring a mechanical error is eliminated.

Additionally, since the representative mechanical error is calculated from the mechanical error at the time of the normal posture form and the mechanical error at the time of the reverse posture form, variations of the mechanical error can be suppressed to acquire the mechanical error close to the actual state.

(4) Under the configuration of (1), the correction processing part is set to output as an measurement angle an angle acquired by canceling the setting error from a measurement angle measured by the angle measuring part while the correction processing part is related to an update determining part determining whether a mechanical error detected by the error detecting part is larger than the setting error, and the update determining part is set to instruct the correction processing part when determining that a mechanical error detected by the error detecting part is larger than the setting error, so as to make an update such that the mechanical error is set as a new setting error.

According to this configuration, if the mechanical error detected by the error detecting part exceeds the setting error, the mechanical error can be cancelled from the measurement angle measured by the angle measuring part so as to increase the accuracy of the measurement angle to be output, whereas if the mechanical error detected by the error detecting part is equal to or less than the setting error, the setting error can be cancelled from the measurement angle measured by the angle measuring part so as to increase the accuracy of the elevation angle to be output under a uniform operation, so that the configuration in the correction processing part can be simplified.

Obviously, if the mechanical error detected by the error detecting part is equal to or less than the setting error, the mechanical error detected by the error detecting part is consequently canceled through the cancellation of the setting error from the measurement angle measured by the angle measuring part.

To achieve the second object, the present invention has the following configurations as described in (5) to (7).

(5) In a surveying instrument usage method in which a surveying instrument measures position information of a construction machine and transmits the position information of the construction machine to the construction machine, the method is configured to comprise preparing as the surveying instrument an instrument including an angle measuring part measuring an angle relative to an object to be measured, an error detecting part detecting a mechanical error reflected in a measurement angle measured by the angle measuring part, a correction processing part receiving a measurement angle measured by the angle measuring part and outputting as a measurement angle an angle acquired by cancelling the mechanical error detected by the error detecting part from the measurement angle, and a communicating part transmitting an output value of the correction processing part to the construction machine;

causing the error detecting part to detect the mechanical error before the surveying instrument establishes a relation to the construction machine; and causing the correction processing part to cancel the mechanical error detected by the error detecting part from the measurement angle measured by the angle measuring part and causing the communicating part to transmit an output value of the correction processing part as a measurement angle to the construction machine when the surveying instrument establishes a relation to the construction machine.

According to this configuration, before the surveying instrument establishes a relation to the construction machine, the mechanical error of the surveying instrument can properly be acquired and, when the surveying instrument establishes a relation to the construction machine, the mechanical error can be canceled from the measurement angle measured by the angle measuring part, so that information including the precise measurement angle prevented as much as possible from reflecting the mechanical error can be transmitted as the measurement information (position information) to the construction machine. Therefore, by utilizing the surveying instrument according to (1) described above, the construction machine can acquire precise self-position information and can provide control with high accuracy based on the precise self-position information.

Since the error detecting part can be caused to detect the mechanical error before the surveying instrument establishes a relation to the construction machine, mechanical errors can be detected in both states of normal and reverse observations unlike when the surveying instrument establishes a relation to the construction machine, so that the representative mechanical error close to the actual state can be acquired from both mechanical errors. Therefore, although the surveying instrument continuously measures the position information of the construction machine and is maintained in one observation state of the normal and reverse observations when the surveying instrument establishes a relation to the construction machine, the surveying instrument can utilize the representative mechanical error and can transmit information including a more precise measurement angle as the measurement information (position information) to the construction machine.

(6) Under the configuration of (5), the construction machine provides upward/downward movement control of a constituent member in the construction machine, the angle measuring part is caused to measure an elevation angle relative to the construction machine, the error detecting part is caused to detect a mechanical error of the surveying instrument affecting the elevation angle, and the correction processing part is caused to output as an elevation angle an angle acquired by cancelling the mechanical error detected by the error detecting part from the elevation angle measured by the angle measuring part.

According to this configuration, with regard to the elevation angle having the greatest influence on the upward/downward movement control of the constituent member in the construction machine, the elevation angle prevented as much as possible from reflecting the mechanical error can be transmitted to the construction machine. Therefore, the accuracy can be increased in the upward/downward movement control of the constituent member in the construction machine.

(7) Under the configuration of (5), before establishing a relation to the construction machine, installation position information of the surveying instrument is acquired based on observation of a known point while the error detecting part is caused to detect the mechanical error in synchronization with the observation.

According to this configuration, a mechanical error detection work can be incorporated in an installation position information acquisition work at the time of use of the surveying instrument, so that the need for independently performing the mechanical error detection work is eliminated. The mechanical error detection work is performed without being known by a user and the mechanical error detection work can be made smart.

To achieve the third object, the present invention has the following configuration as described in (8).

(8) A construction machine control system is configured to comprise a construction machine performing a ground leveling work; a surveying instrument measuring position information of the construction machine and transmitting the position information of the construction machine to the construction machine; and a control apparatus disposed on the construction machine to control the construction machine by utilizing the position information from the surveying instrument, the surveying instrument including an angle measuring part measuring as the position information of the construction machine an angle relative to an object to be measured, an error detecting part detecting a mechanical error of the surveying instrument reflected in a measurement angle before establishing a relation to the construction machine, and a correction processing part receiving a measurement angle measured by the angle measuring part and outputting as a measurement angle an angle acquired by cancelling the mechanical error detected by the error detecting part from the measurement angle.

According to this configuration, by using the surveying instrument according to (1) described above, the position information with high measurement accuracy can be utilized by the construction machine, and the control accuracy of the construction machine can be increased.

From the above, the present invention can provide the surveying instrument capable of easily outputting measurement information prevented as much as possible from reflecting a mechanical error without particular checking and adjustment of accuracy.

The present invention can provide the surveying instrument usage method using the surveying instrument and the construction machine control system utilizing the surveying instrument.

DESCRIPTION OF THE PREFERRED EMBODIMENTS

Embodiments of the present invention will now be described with reference to the drawings.

Figure 1:
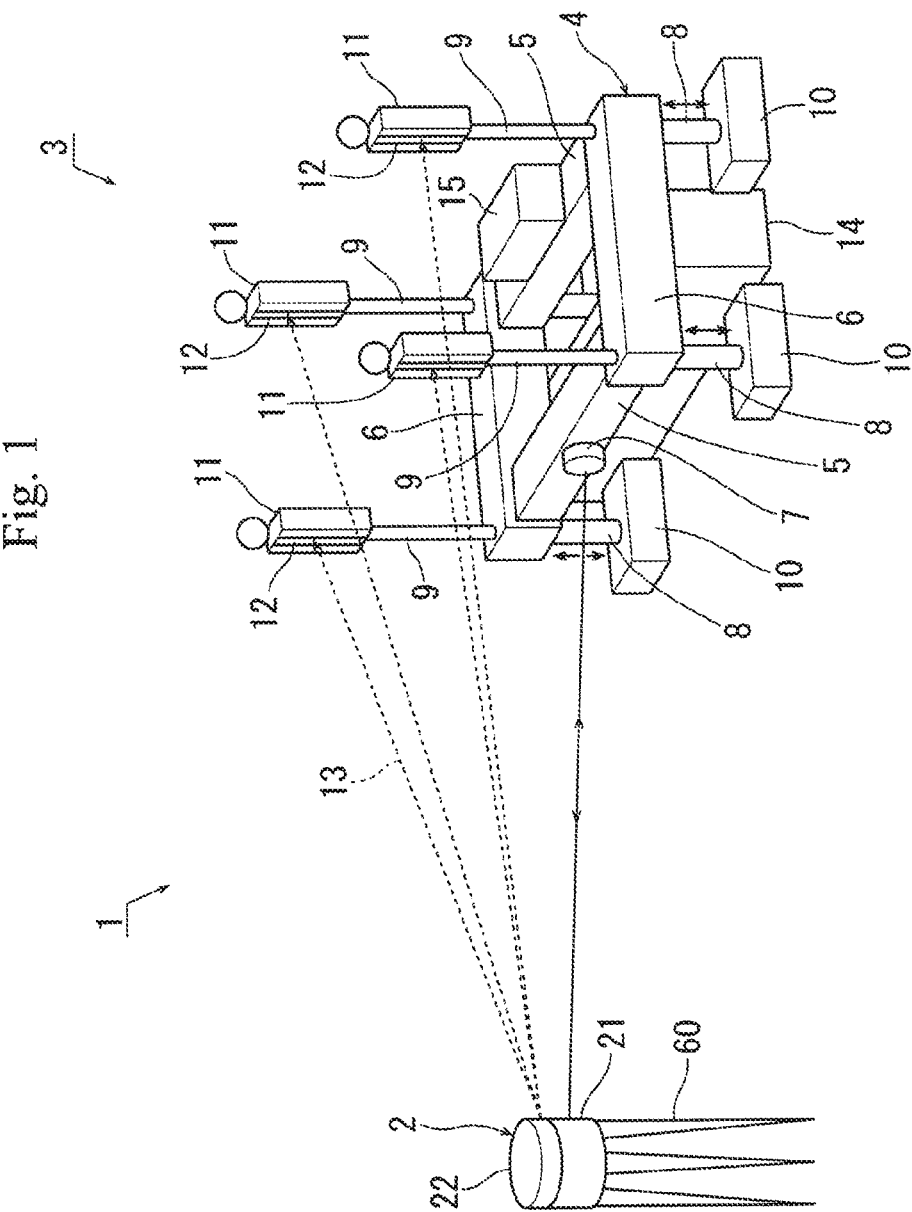
FIG. 1 is an explanatory view for explaining a control system of a slip form paving machine according to a first embodiment.

FIG. 1 is a view of an overall configuration of a construction machine control system 1 according to an embodiment. The construction machine control system 1 includes a laser surveying instrument 2 acting as a surveying instrument and a slip form paving machine (hereinafter referred to as a paving machine) 3 acting as a construction machine performing continuous pavement with a concrete slab. In the construction machine control system 1, generally, the laser surveying instrument 2 continuously measures position information of the paving machine 3 and continuously transmits the position information to the paving machine 3, and the paving machine 3 utilizes the position information of the paving machine 3 transmitted from the laser surveying instrument 2 to control the paving machine 3 (to provide a height control of a concrete placement surface).

The paving machine 3 and the laser surveying instrument 2 will specifically be described.

As shown in FIG. 1, the paving machine 3 includes a body frame 4.

The body frame 4 is made up of a pair of oppositely arranged long side members 5 and a pair of oppositely arranged short side members 6 formed into a grid shape (rectangle shape), and the two long side members 5 are arranged in parallel in the front-back direction of the paving machine 3 with four corner portions of the body frame 4 facing in the up-down direction. The front long side member 5 of the two long side members 5 has a front surface provided with a target (prism) 7 that is a measurement object of the laser surveying instrument 2. The target 7 is positioned at a known position relative to an apparatus reference position (set to a screed 14 described later) of the paving machine 3, and the apparatus reference position is comprehended based on position information of the target 7.

As shown in FIG. 1, respective leg parts 8 are disposed on lower parts of the four corner portions of the body frame 4 and respective support posts 9 are provided on upper parts of the four corner portions.

The leg parts 8 are extendable and retractable in the up-down direction, and the leg parts 8 are provided with respective running apparatuses 10.

The support posts 9 have beam detectors 11 at upper ends. The beam detectors 11 respectively include light-receiving sensors (e.g., line sensors) 12 extending in the up-down direction and, when a horizontal laser beam 13 described later from the laser surveying instrument 2 passes therethrough, the light-receiving sensors 12 detects the reception of the laser beam 13 and can detect the light-receiving position. With regard to the light-receiving sensors 12, reference positions in the up-down direction (e.g., the center in the up-down direction) are known positions relative to the apparatus reference position and the target 7 of the paving machine 3, and the respective arrangement relationships (such as distances) are known.

As shown in FIG. 1, the screed 14 is disposed on a central lower surface of the body frame 4. The screed 14 stores kneaded concrete and also executes a series of steps of placement and compaction molding with high accuracy, and the height control of the screed 14 (placement surface height control) is mainly provided by extension/retraction control of the leg parts 8. The apparatus reference position of the paving machine 3 is set in the screed 14, and a state of the height control of the screed 14 (the placement surface height control) can be comprehended by knowing a status of the apparatus reference position.

As shown in FIG. 1, the body frame 4 includes a control apparatus 15 so as to control the screed 14, the running apparatuses 10, etc.

Figure 3:
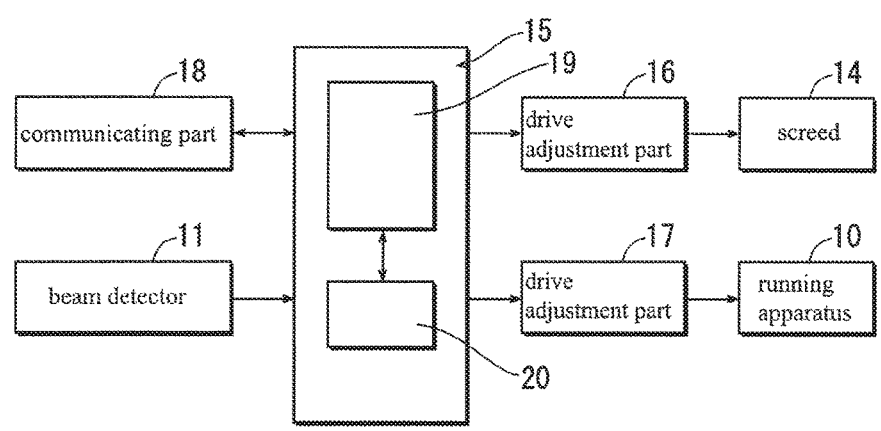
FIG. 3 is an explanatory view for explaining a control system of the slip form paving machine according to the first embodiment.

Therefore, as shown in FIG. 3, control signals are output from the control apparatus 15 to a drive adjustment part 16 driving and adjusting the screed 14 and to a drive adjustment part 17 driving and adjusting the running apparatuses 10, and information is input to the control apparatus 15 from a communicating part 18 and the beam detectors 11.

The control apparatus 15 receives through the communicating part 18 the measurement information (position information) of the target 7 from the laser surveying instrument 2 to determine the position of the paving machine 3, receives light reception result information from the beam detectors 11 to determine a posture and a tilt of the paving machine 3, and outputs the control signals for providing the height control (placement surface height control) of the screed 14, the running control of the running apparatuses 10, etc. based on the information of the posture, tilt, position etc. of the paving machine 3. Therefore, particularly with regard to the height control of the screed 14, when the preciseness becomes higher in the position information (particularly an elevation angle Av) of the target 7 received by the control apparatus 15, the finished surface height accuracy becomes higher in road pavement construction. In FIG. 3, reference numeral 19 denotes an operation processing part, and reference numeral 20 denotes a storage part.

Since the paving machine 3 is already known (e.g., Japanese Laid-Open Patent Publication No. 2014-55499), the details of the paving machine 3 will not further be described and the disclosure of Japanese Laid-Open Patent Publication No. 2014-55499 is incorporated herein by reference.

As shown in FIG. 1, the laser surveying instrument 2 has a structure integrated with an optical wave distance measurement apparatus 21 and a laser irradiation apparatus 22.

Like a total station, the optical wave distance measurement apparatus 21 has a function of applying a distance measuring light toward a measurement point (target: specifically the prism) and receiving a reflected distance measuring light from the measurement point to measure a distance and an angle. Therefore, as shown in FIG. 2, the optical wave distance measurement apparatus 21 includes as constituent components a leveling plate 23 attached to a tripod 60, a base 24 disposed rotatably around a vertical axis (indicated by a dashed-dotted line) Sv on the leveling plate 23, a pair of support post parts 25 disposed on both sides of the vertical axis Sv on the base 24, and a telescope part 26 disposed rotatably around a horizontal axis (indicated by a dashed-dotted line) Sh on the pair of the support post part 25.

Figure 2:
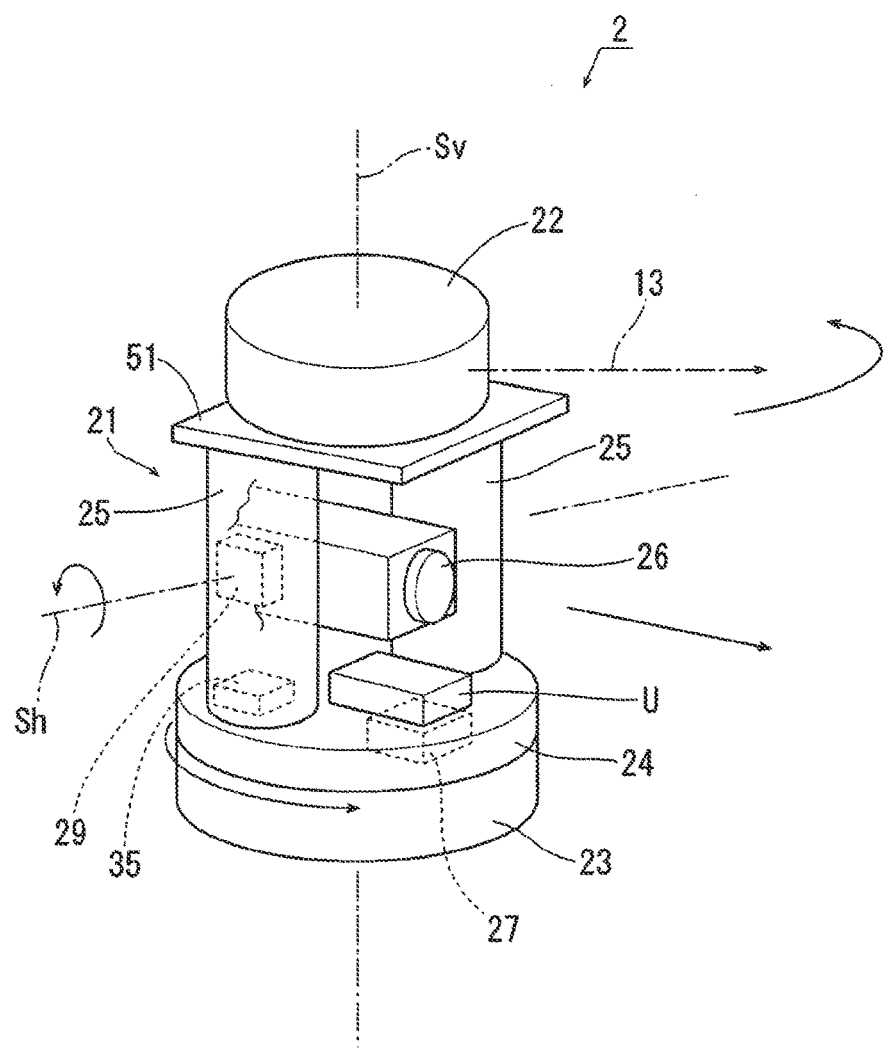
FIG. 2 is a schematic perspective view of a laser surveying instrument according to the first embodiment.

As shown in FIG. 2, the leveling plate 23 has a horizontal rotation driving part (servomotor) 27 and a horizontal angle measuring part (encoder: not shown in FIG. 2) 28 acting as angle measuring part built-in, and the support post parts 25 has a vertical rotation driving part (servomotor) 29 and an elevation angle measuring part 30 (encoder: not shown in FIG. 2) acting as an angle measuring part built-in. The horizontal rotation driving part 27 drives the base 24 to rotate horizontally around the vertical axis Sv, and the horizontal angle measuring part 28 detects an amount of rotation of the base 24 around the vertical axis Sv to measure a horizontal angle Ah of (the collimation axis of) the telescope part 26. The vertical rotation driving part 29 drives the telescope part 26 to rotate around the horizontal axis Sh, and the elevation angle measuring part 30 detects an amount of rotation of the telescope part 26 around the horizontal axis Sh to measure an elevation angle Av of (the collimation axis of) the telescope part 26.

The telescope part 26 can acquire an image (telescopic image) in the collimation direction with an imaging part (not shown) through an optical system thereof. The telescope part 26 has a built-in distance measuring part utilizing the optical system, and the distance measuring part emits a distance measuring light and receives a reflected distance measuring light from an object to be measured to perform the optical wave distance measurement for the object to be measured.

As shown in FIG. 2, a control unit U is disposed on the base 24.

Figure 4:
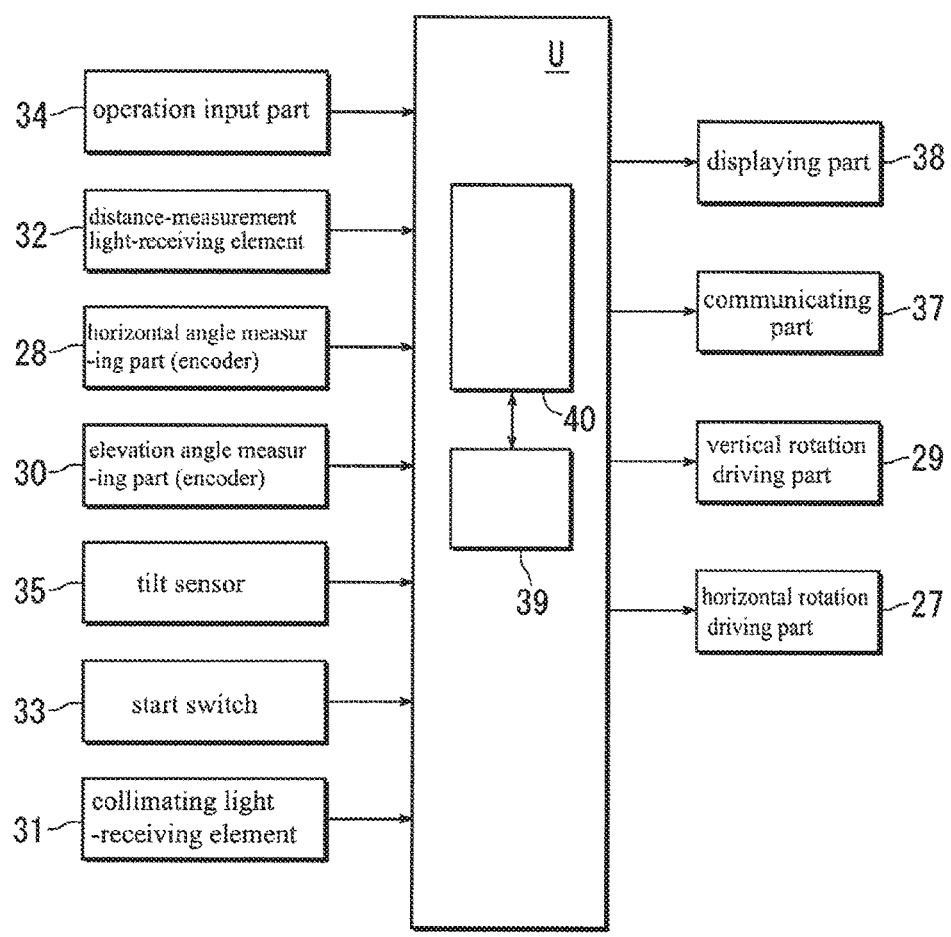
FIG. 4 is an explanatory view for explaining a control system of the laser surveying instrument according to the first embodiment.

As shown in FIG. 4, the control unit U inputs various respective input signals from the elevation angle measuring part 30, the horizontal angle measuring part 28, a collimating light-receiving element (area sensor) 31 receiving a reflected collimation light of a collimation light emitted from a collimating light-emitting part (not shown), a distance-measurement light-receiving element 32 receiving a reflected distance measuring light of a distance measuring light emitted from a distance-measurement light-emitting part (not shown), a start switch 33, an operation input part 34 (not shown in FIG. 2) for an input operation from the outside, and a tilt sensor 35 disposed in the support post part 25 to detect a mechanical error (angle) of the laser surveying instrument 2, while the control unit U outputs various output signals to the vertical rotation driving part 29, the horizontal rotation driving part 27, a communicating part 37 performing transmission to and reception from the paving machine 3 (the communicating part 18), and a displaying part 38 (not shown in FIG. 2).

In this case, since the paving machine 3 must eliminate an error in the up-down direction as much as possible for the purpose of providing the height control of the concrete placement surface in this embodiment, the tilt sensor 35 detects a vertical-axis error $\Delta\theta$ having the greatest influence out of the mechanical errors (angles) affecting the elevation angle.

As shown in FIG. 4, the control unit U includes a storage part 39 and a control operation part 40 so as to ensure functions as a computer.

The storage part 39 stores a basic program necessary for measurement as well as a program for executing an automatic calibration process, a program for determining a setting error, setting information, etc., and these various programs etc. are read by the control operation part 40 as needed. Necessary information is stored as appropriate.

Figure 5:
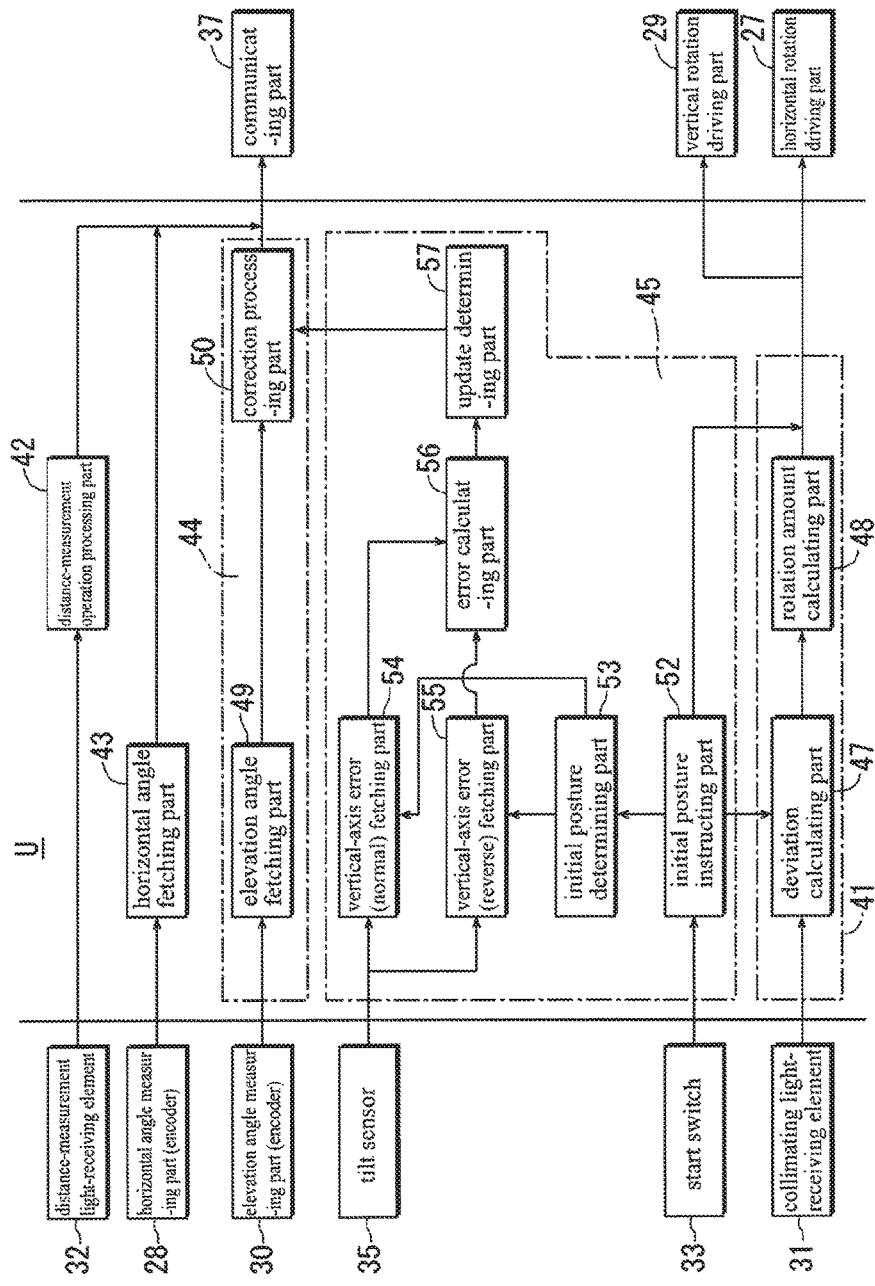
FIG. 5 is an explanatory view for explaining specific details of a control unit in the laser surveying instrument according to the first embodiment.

As shown in FIG. 5, the control operation part 40 acts as an automatic collimation control part 41, a distance-measurement operation processing part 42, a horizontal angle fetching part 43, an elevation angle correcting part 44, and an automatic calibration part 45 based on the program read from the storage part 26.

The automatic collimation control part 41 has a function (autocollimation) of matching the center of a target (prism) and the center of a field of view of a telescope (collimation axis) and, to achieve this function, the automatic collimation control part 41 includes a deviation calculating part 47 and a rotation amount calculating part 48. When the target at least partially comes into the field of view of a telescope (imaging range), the deviation calculating part 47 acquires the information thereof from the collimating light-receiving element 31 to calculate a horizontal deviation $\Delta x$ and a vertical deviation $\Delta y$ of the center of the target from the collimation axis, and the rotation amount calculating part 48 calculates the rotation amounts of the vertical rotation driving part 29 and the horizontal rotation driving part 27 based on the information from the deviation calculating part 47 such that the deviations $\Delta x$, $\Delta y$ are eliminated by the rotational drive of the vertical rotation driving part 29 and the horizontal rotation driving part 27, and outputs the rotation amounts to the vertical rotation driving part 29 and the horizontal rotation driving part 27.

The distance-measurement operation processing part 42 has a function of calculating a phase difference between a reflected distance measuring light and a reference light based on the information from the distance-measurement light-receiving element 32 (the reference light directly made incident on the distance-measurement light-receiving element from the distance-measurement light-emitting part through an optical fiber not shown, and the reflected distance measuring light made incident on the distance-measurement light-receiving element 32) and deriving a distance to the target based thereon, and this distance information is output to the communicating part 37.

The horizontal angle fetching part 43 has a function of fetching information from the horizontal angle measuring part 28 and outputting the information as a horizontal angle (value) to the communicating part 37.

The elevation angle correcting part 44 has a function of correcting the elevation angle measured by the elevation angle measuring part 30 mainly in consideration of the vertical-axis error and, to achieve the function, the elevation angle correcting part 44 includes an elevation angle fetching part 49 and a correction processing part 50. The elevation angle fetching part 49 has a function of fetching information from the elevation angle measuring part 30 and outputting the information as the elevation angle (value) Av to the correction processing part 50, and the correction processing part 50 has a function of cancelling (subtracting) a setting error (angle) $\Delta\theta 0$ from the elevation angle Av from the elevation angle measuring part 30 to acquire an elevation angle Av (Av=Av$-\Delta\theta 0$) and outputting this elevation angle Av to the communicating part 37. In this case, the setting error $\Delta\theta 0$ is initially set in consideration of a typical mechanical error of the laser surveying instrument 2 and, as described later, if the vertical-axis error (angle) $\Delta\theta$ detected by the tilt sensor 35 is larger than the setting error $\Delta\theta 0$, the setting error $\Delta\theta 0$ is updated to the vertical-axis error $\Delta\theta 0$ based on an instruction signal from an update determining part 57 described later.

Figure 11:
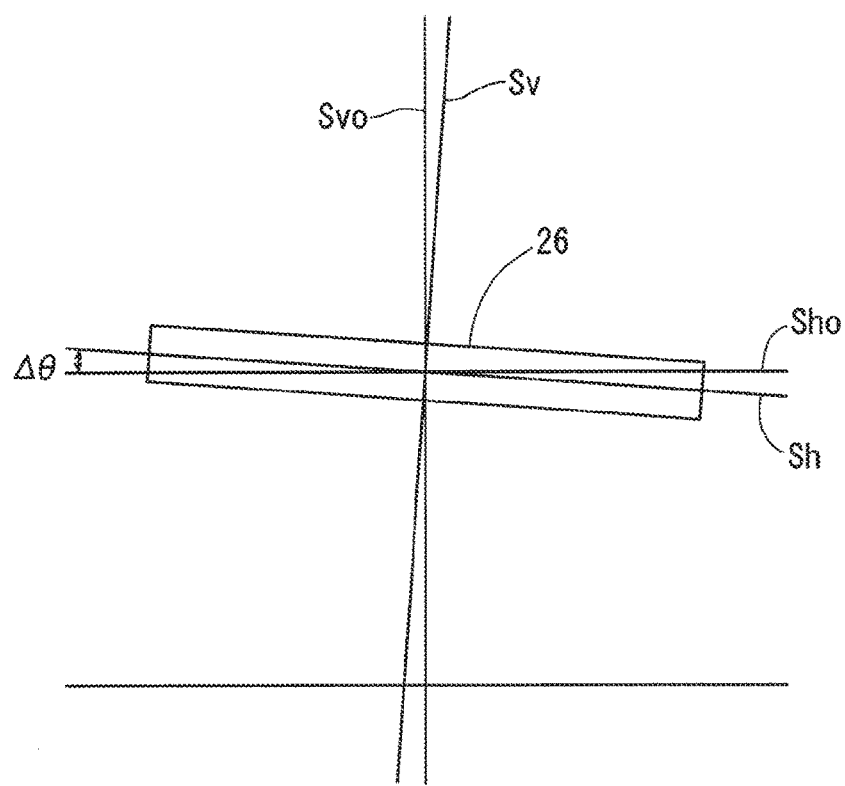
FIG. 11 is an explanatory view for explaining that a vertical-axis error affects an elevation angle.

The automatic calibration part 45 has a function of deriving the vertical-axis error $\Delta\theta$ (angle) of the laser surveying instrument 2 and sending the vertical-axis error $\Delta\theta$ to the correction processing part 50 so as to increase the preciseness of the measurement information (the position information of the paving machine 3) transmitted from the communicating part 37. In this embodiment, the high positional accuracy in the up-down direction is required for providing the height control of the screed 14 in the paving machine 3. Therefore, if the laser surveying instrument 2 has a vertical-axis error $\Delta\theta$ as shown in FIG. 11, the vertical-axis error $\Delta\theta$ is reflected (included) in an elevation angle Av, resulting in deterioration in the height control of the screed 14 utilizing such an elevation angle Av. Therefore, to prevent the vertical-axis error $\Delta\theta$ from being reflected in the elevation angle Av measured by the elevation angle measuring part 30 in the correction processing part 50, the automatic calibration part 45 includes an initial posture instructing part 52, an initial posture determining part 53, a vertical-axis error (normal) fetching part 54, a vertical-axis error (reverse) fetching part 55, an error calculating part 56, and an update determining part 57. In FIG. 11, Svo denotes a vertical line; Sv denotes a vertical axis; Sho denotes a horizontal line; and Sh denotes a horizontal axis.

The initial posture instructing part 52 has a function of outputting instruction signals to the vertical rotation driving part 29 and the horizontal rotation driving part 27 to cause the telescope part 26 to sequentially take a normal posture (normal observation state), which is an initial posture, and a reverse posture (reverse observation state: a state in which the telescope part 26 is inverted 180° relative to the horizontal axis Sh and rotated 180° in the horizontal direction around the vertical axis Sv from the normal posture) on the condition that the start switch 33 is activated. In this case, to acquire the installation position information of the laser surveying instrument 2, the automatic collimation function is provided at the time of the normal posture so that the center of the field of view of a telescope is locked to the target at a known position.

The initial posture determining part 53 has function of outputting to the vertical-axis error (normal) fetching part 54 a fetching instruction signal for the vertical-axis error from the tilt sensor 35 when determining that the telescope part 26 has taken the normal posture based on the instruction of the initial posture instructing part 52, and outputting to the vertical-axis error (reverse) fetching part 54 a fetching instruction signal for the vertical-axis error from the tilt sensor 35 when determining that the telescope part 26 has taken the reverse posture based on the instruction of the initial posture instructing part 52.

The vertical-axis error (normal) fetching part 54 has a function of fetching and outputting the vertical-axis error $\Delta\theta r$ from the tilt sensor 35 to the error calculating part 56 on the condition that the fetching instruction signal from the initial posture determining part 53 is input.

The vertical-axis error (reverse) fetching part 55 has a function of fetching and outputting the vertical-axis error $\Delta\theta l$ from the tilt sensor 35 to the error calculating part 56 on the condition that the fetching instruction signal from the initial posture determining part 53 is input. In this case, the tilt sensor 35, the vertical-axis error (normal) fetching part 54, and the vertical-axis error (reverse) fetching part 55 constitute an error detecting part.

The error calculating part 56 has a function of calculating a representative error $\Delta\theta$ from the vertical-axis error $\Delta\theta r$ output from the vertical-axis error (normal) fetching part 54 and the vertical-axis error $\Delta\theta l$ output from the vertical-axis error (reverse) fetching part 55 and, in this embodiment, an average value of the vertical-axis error $\Delta\theta r$ and the vertical-axis error $\Delta\theta l$ is calculated as the representative error $\Delta\theta$ ($\Delta\theta=(\Delta\theta r+\Delta\theta l)/2$).

The update determining part 57 has a function of comparing the error $\Delta\theta$ calculated by the error calculating part 56 and the setting error $\Delta\theta 0$ set in advance and instructing the correction processing part 50 to update the setting error $\Delta\theta 0$ to the error $\Delta\theta$ if the error $\Delta\theta$ is larger than the setting error $\Delta\theta 0$ ($\Delta\theta > \Delta\theta 0$).

The laser irradiation apparatus 22 of the laser surveying instrument 2 is disposed on the pair of the support post part 25 via a top plate 51 as shown in FIG. 2. The laser irradiation apparatus 22 emits a laser beam 13 with a dot-shaped luminous flux cross section in the horizontal direction to radiate the laser beam 13 rotationally at a constant speed as indicated by an arrow of FIG. 2. As a result, the light-receiving sensors 12 of the beam detectors 11 of the paving machine 3 receive the laser beam 13 and the control apparatus 15 determines the posture, tilt, etc. of the paving machine 3 as described above based on the reception result thereof.

Processes and control by the control unit U will generally be described mainly with respect to the automatic calibration process.

Before establishing a relation to (measuring the position of) the paving machine 3, the laser surveying instrument 2 executes the automatic calibration process. This automatic calibration process is incorporated in an installation position information acquisition work of the laser surveying instrument 2, and the vertical-axis error $\Delta\theta$ is detected by the tilt sensor 35 as the mechanical error affecting the elevation angle Av in synchronization with the installation position information acquisition work.

Therefore, when the laser surveying instrument 2 is disposed at a predetermined position and the start switch 33 is then activated, the laser surveying instrument 2 measures the target present at a known position under the respective states of normal and reverse observations to acquire its own installation position information based on this measurement and, accordingly, the tilt sensor 35 detects the vertical-axis errors $\Delta\theta r$, $\Delta\theta l$ under the respective states of normal and reverse observations to obtain the representative value (average value) $\Delta\theta$ thereof. The detection of the vertical-axis error $\Delta\theta$ by the tilt sensor 35 is related to the fact that a positional state of the base 24 changes (rotates 180° around the vertical axis Sv) as the normal and reverse observation states are achieved.

The vertical-axis error $\Delta\theta$ detected by the tilt sensor 35 is utilized by the correction processing part 50 correcting the elevation angle Av detected by the elevation angle measuring part 30. The correction processing part 50 is initially set to cancel the setting error $\Delta\theta 0$ from the elevation angle Av detected by the elevation angle measuring part 30 (Av=Av−$\Delta\theta 0$) and, if the vertical-axis error $\Delta\theta$ detected by the tilt sensor 35 is larger than the setting error $\Delta\theta 0$, an update is made to set the vertical-axis error $\Delta\theta$ detected by the tilt sensor 35 as the new setting error $\Delta\theta 0$.

If the vertical-axis error $\Delta\theta$ detected by the tilt sensor 35 is equal to or less than the setting error, the vertical-axis error $\Delta\theta$ detected by the tilt sensor 35 is cancelled from the elevation angle Av detected by the elevation angle measuring part 30 through the cancellation of the setting error $\Delta\theta 0$.

As a result, subsequently, when the laser surveying instrument 2 measures the position information of the paving machine 3, the correction processing part 50 cancels the vertical-axis error $\Delta\theta$ detected by the tilt sensor 35 from the elevation angle Av detected by the elevation angle measuring part 30 to acquire the elevation angle Av to be transmitted, and the communicating part 37 transmits the elevation angle Av with increased preciseness to the paving machine 3 along with other pieces of position information (the horizontal angle, the distance). Consequently, the height control of the screed 14 provided by utilizing the transmission information is increased in accuracy particularly based on the increased preciseness of the elevation angle Av.

Figure 6:
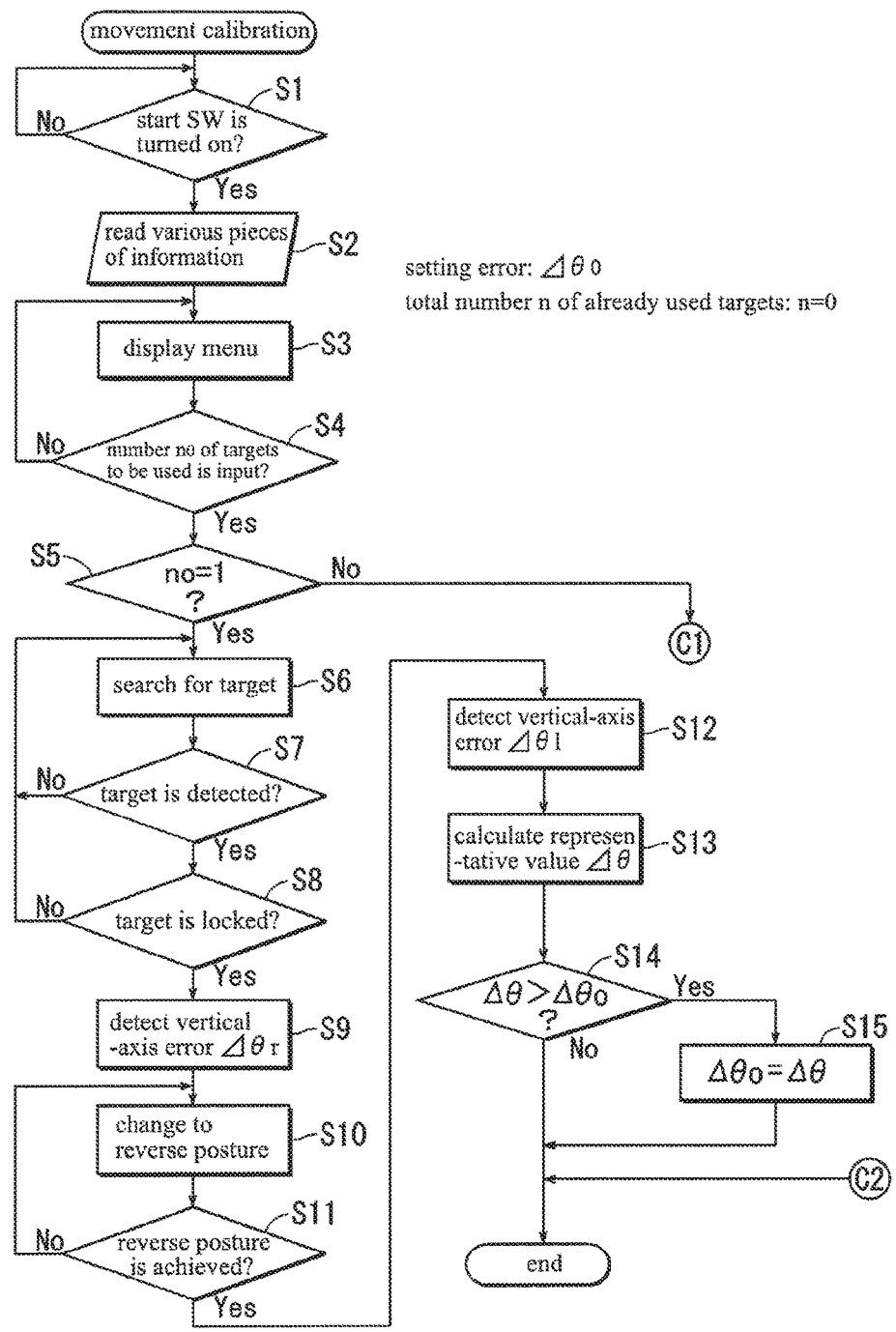
FIG. 6 is a flowchart of a control example of the control unit in the laser surveying instrument according to the first embodiment.
Figure 7:
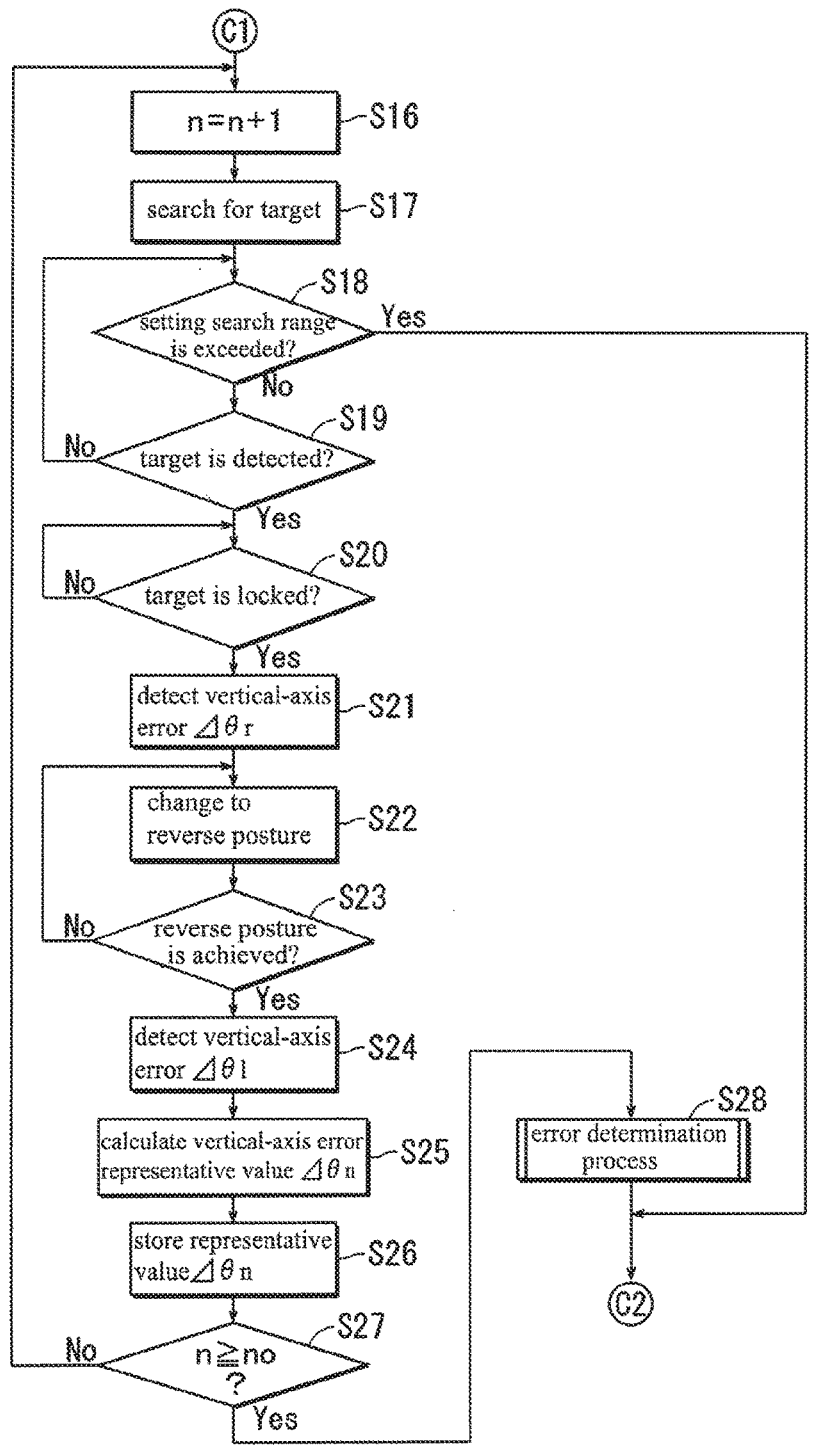
FIG. 7 is a flowchart continued from FIG. 6.

Processes and control examples of the control unit U will specifically be described with reference to flowcharts shown in FIGS. 6 and 7. It is noted that S stands for a step.

First, the laser surveying instrument 2 is disposed at a predetermined position in consideration that the laser beam 13 reaches the paving machine 3, that the target located at a known point is detected, etc. This is performed so as to enable the laser surveying instrument 2 to participate in the control in the paving machine 3 and to acquire self-position information (installation position information) of the laser surveying instrument 2.

When the start switch is turned on in this state, various pieces of information are read (S1, S2). In this embodiment, the various pieces of information include the setting error $\Delta\theta 0$ (set to a typical mechanical error) of the laser surveying instrument 2, the number n of targets already used in the automatic calibration process being set to n=0 (default), a search route and a search range of targets, etc.

After the various pieces of information are read at S2, the displaying part 38 displays a menu display, and the menu display prompts input of the number of targets to be used in the automatic calibration process and the position information acquisition work for the installation position. When the number n0 of targets to be used is input from the operation input part 34 based on guidance on the menu display (S4), it is determined at S5 whether the number n0 of targets to be used satisfies n0=1. This is because a final mechanical error determination process differs depending on whether the number n0 of targets to be used satisfies n0=1 as described later.

S5 is YES if the number of targets to be used is n0=1 and, in this case, a target used for acquiring the installation position information is searched for (S6) and, when the target is detected, the target is locked based on the automatic collimation function (matching the center of the target and the center of the field of view of the telescope part 26 (collimation axis)) (completion of automatic collimation: S7, S8).

After the target is locked at S8, a vertical-axis error (angle) $\Delta\theta r$ is detected as a mechanical error at S9 based on the information from the tilt sensor 35. This detection of the vertical-axis error $\Delta\theta r$ is performed in the normal observation state and, obviously, the target (known point) is also measured at this timing for acquiring the installation position information.

After the detection process of the vertical-axis error $\Delta\theta r$ of S9, the telescope part 26 is changed to the reverse posture (the posture of the telescope part 26 inverted by 180° relative to the horizontal axis and rotated 180° around the vertical axis) by the vertical rotation driving part 29 and the horizontal rotation driving part 27 (S10) and, when the reverse posture is confirmed (S11), the vertical-axis error $\Delta\theta l$ is detected at S12 as a mechanical error under the reverse observation state based on the information from the tilt sensor 35. Obviously, also under this reverse observation state, the target (known point) is measured for acquiring the installation position information.

Subsequently, at S13, the representative value $\Delta\theta$ of the vertical-axis error is calculated from the vertical-axis error $\Delta\theta r$ in the normal observation state and the vertical-axis error $\Delta\theta l$ in the reverse observation state. In this embodiment, the average value of $\Delta\theta r$ and $\Delta\theta l$ ($\Delta\theta=(\Delta\theta r+\Delta\theta l)/2$) is calculated as the representative value $\Delta\theta$.

After the representative value $\Delta\theta$ of the vertical-axis error is calculated at S13, it is determined at S14 whether the representative value $\Delta\theta$ of the vertical-axis error is larger than the setting error $\Delta\theta 0$ set in the correction processing part 50. This is performed because although the representative value $\Delta\theta$ of the vertical-axis error smaller than the setting error $\Delta\theta 0$ has almost no influence on the height control of the concrete placement surface of the paving machine 3 if the current setting error $\Delta\theta 0$ is taken into consideration, the representative value $\Delta\theta$ of the vertical-axis error larger than the setting error $\Delta\theta 0$ is reflected in the elevation angle and deteriorates the height control of the concrete placement surface of the paving machine 3 as it is. Therefore, if S14 is NO, the automatic calibration process is terminated without a change and, if S14 is YES, the representative value $\Delta\theta$ calculated at S13 is stored to update the setting error $\Delta\theta 0$ at S15 before the termination of the automatic calibration process. The updated and stored setting error $\Delta\theta 0$ (=$\Delta\theta$) is reflected in the correction processing part 50 and the final elevation angle Av is acquired by excluding the vertical-axis error ($\Delta\theta 0$=$\Delta\theta$) from the elevation angle detected by the elevation angle measuring part 30.

Subsequently, the control of the paving machine 3 is provided and, when the laser surveying instrument 2 starts acquiring the position information (distance, horizontal angle, elevation angle) of the paving machine 3 (the target 7) by measuring the target (prism) 7 of the paving machine 3, the vertical-axis error $\Delta\theta$ related to the elevation angle is excluded with respect to the elevation angle Av thereof, and the position information (distance, horizontal angle) including the elevation angle Av with increased preciseness is transmitted through the communicating part 37 to the paving machine 3. As a result, the paving machine 3 utilizes the transmitted position information to provide the height control of the concrete placement surface with high accuracy.

S5 is NO if the number n0 of targets to be used in the automatic calibration is plural. In this case, at S16, the number n of already used targets is set to n+1. Since n=0 is initially read as the initial information, n=1 is set when the process proceeds to S16 for the first time. At S17 subsequent to S16, a target used for acquiring the installation position information is searched for. The target is searched for in accordance with the search range and the search route stored in advance in the storage part 39.

Subsequently, at S18, it is determined whether the field of view of a telescope exceeds a setting search range. If S18 is YES, the process is terminated since the setting search range is exceeded and, if S18 is NO, it is determined at S19 whether the target is detected. If S19 is NO, the process is returned to S18 to continue searching for the target and, if S19 is YES, it is determined at S20 whether the target is locked (automatically collimated).

If S20 is YES, the vertical-axis error $\Delta\theta r$ is detected as a mechanical error by the tilt sensor 35 at S21. This detection of the vertical-axis error $\Delta\theta r$ is performed in the normal observation state and, obviously, the target (known point) is also measured at this timing for acquiring self-position information. After the detection process of the vertical-axis error $\Delta\theta r$ of S21, the telescope part 26 is changed to the reverse posture by the vertical rotation driving part 29 and the horizontal rotation driving part 27 (S22) and, when the reverse posture is confirmed (S23), the vertical-axis error $\Delta\theta l$ is detected at S24 as a mechanical error by the tilt sensor 35 under the reverse observation state. Obviously, also under this reverse observation state, the target (known point) is measured for acquiring the installation position information.

At S25 subsequent to the process of S24, a representative value $\Delta\theta n$ is calculated from the vertical-axis error $\Delta\theta r$ in the normal observation state and the vertical-axis error $\Delta\theta l$ in the reverse observation state. Since this representative value $\Delta\theta n$ reflects the result of S16, when the process of S25 is executed for the first time, the vertical-axis error $\Delta\theta n$ is calculated as $\Delta\theta 1$ and is stored as $\Delta\theta 1$ at S26. Also in this case, when the representative value $\Delta\theta n$ is calculated, $\Delta\theta r$ and $\Delta\theta l$ are averaged ($\Delta\theta$=($\Delta\theta r$+$\Delta\theta l$)/2).

At S27 subsequent to the process of S26, it is determined whether the total number n of already used targets becomes equal to or greater than the total number n0 of targets to be used. This is performed to acquire representative values $\Delta\theta n$ of vertical-axis errors to the total number n0 of targets to be used. S27 is initially NO and, in this case, the process is returned to S16 to repeat the process of S16 to S26. As a result, at S26, the representative values $\Delta\theta 1$, $\Delta\theta 2$, $\Delta\theta 3$ . . . $\Delta\theta n0$ of the vertical-axis errors at the time of detection of the targets in the normal and reverse observation states are sequentially stored and, when the number thereof reaches the total number n0 of targets to be used input at S4 (S27), the process goes to S28.

Figure 8:
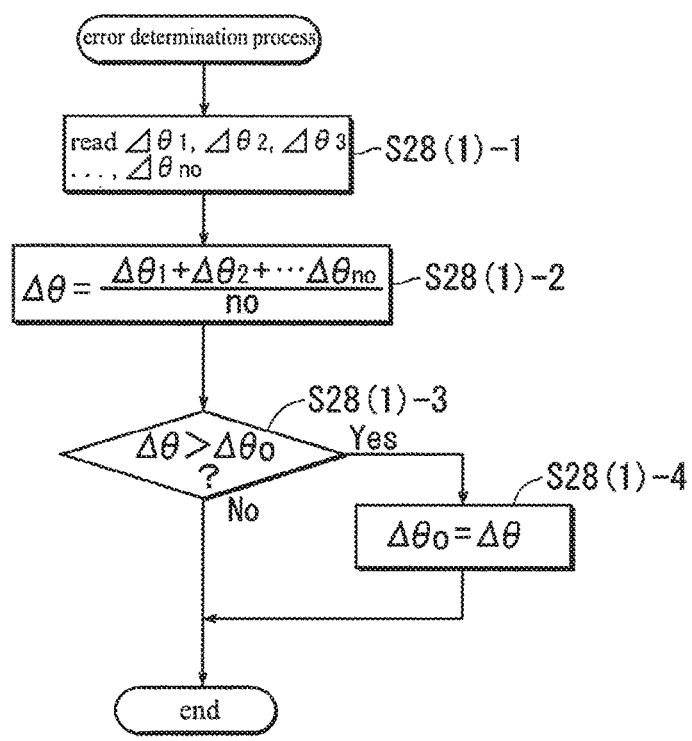
FIG. 8 is a flowchart of an error determination process according to the first embodiment.

At S28, an error determination process is executed for determining a final representative value from a plurality of the representative values $\Delta\theta 1$, $\Delta\theta 2$, $\Delta\theta 3$ . . . $\Delta\theta n0$ of the vertical-axis errors. Specifically, as shown in FIG. 8, the plurality of the representative values $\Delta\theta 1$, $\Delta\theta 2$, $\Delta\theta 3$ . . . $\Delta\theta n0$ stored at S26 is read at S28(1)-1 and, subsequently at S28(1)-2, the average value $\Delta\theta$ of $\Delta\theta 1$, $\Delta\theta 2$, $\Delta\theta 3$ . . . $\Delta\theta n0$ is calculated and the average value $\Delta\theta$ is defined as the final representative value (hereinafter denoted by the same reference numeral $\Delta\theta$ as the average value). Subsequently at S28(1)-3, it is determined whether the final representative value $\Delta\theta$ is larger than the setting error $\Delta\theta 0$. If the determination of S28(1)-3 is NO, the process is simply terminated and, if the determination of S28(1)-3 is YES, the final representative value $\Delta\theta$ is defined as the setting error $\Delta\theta 0$ at S28(1)-4 and the process is terminated. Obviously, the setting error $\Delta\theta 0$ (=$\Delta\theta$) at S28(1)-4 is reflected in the correction processing part 50 of the laser surveying instrument 2.

As a result, also in this case, the position information (distance, horizontal angle) including the elevation angle Av with increased preciseness is transmitted through the communicating part 37 to the paving machine 3 (the communicating part 18) as the measurement information of the paving machine 3 in the subsequent control of the paving machine 3.

In this case, since the vertical-axis error is derived by using a plurality of targets, as compared to the case of using only one target, variations of measurement value (vertical-axis error) can be suppressed to reduce an error (approximate the actual state) by means of statistical processing.

Figure 9:
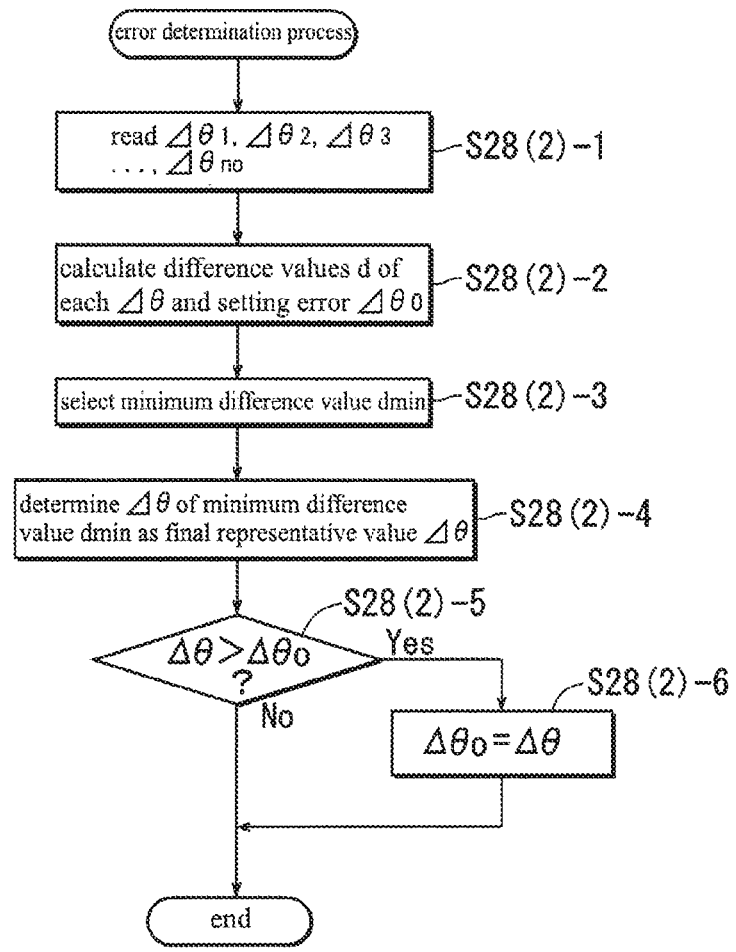
FIG. 9 is a flowchart of an error determination process according to a second embodiment.
Figure 10:
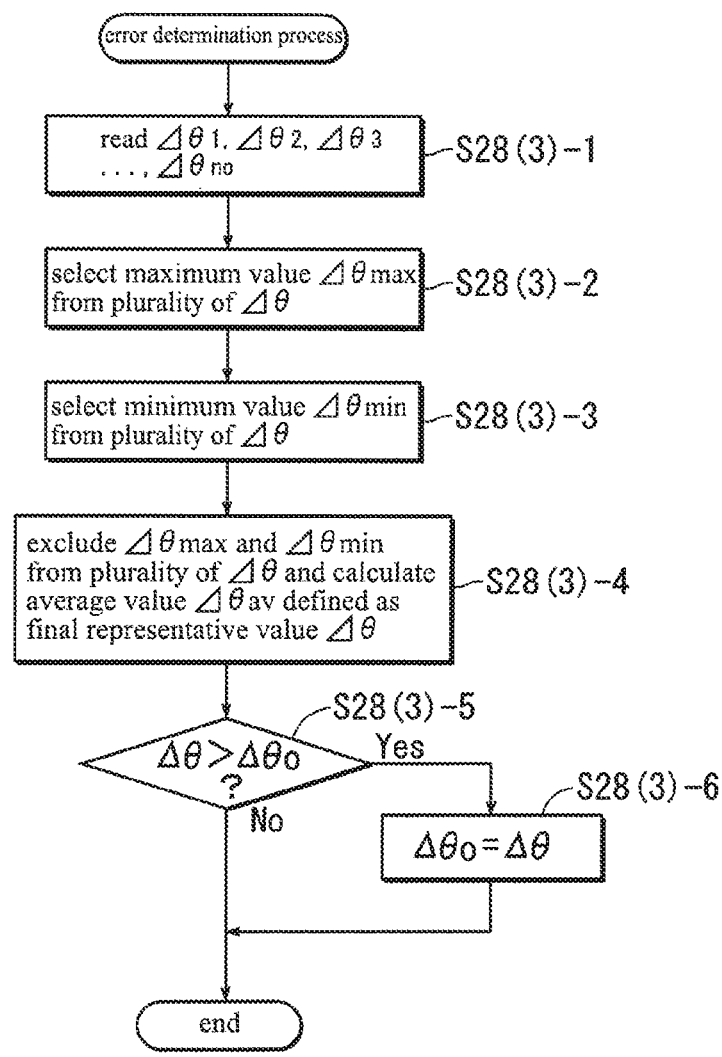
FIG. 10 is a flowchart of an error determination process according to a third embodiment.

FIG. 9 shows a second embodiment and FIG. 10 shows a third embodiment. In these embodiments, the same constituent elements as the first embodiment will be denoted by the same reference numerals and will not be described.

The second embodiment shown in FIG. 9 is a modification example of the error determination process according to the first embodiment. Specifically, at S28(2)-1, a plurality of representative values $\Delta\theta 1$, $\Delta\theta 2$, $\Delta\theta 3$ . . . $\Delta\theta n0$ of vertical-axis errors is read and, subsequently at S28(2)-2, a difference value d of each of the representative values $\Delta\theta 1$, $\Delta\theta 2$, $\Delta\theta 3$ . . . $\Delta\theta n0$ and the setting error $\Delta\theta 0$ is calculated.

In this case, an elevation angle error based on observation is also taken into consideration as the setting error $\Delta\theta 0$ in this embodiment to use the elevation angle error based on observation when a target positioned about 100 m away from the surveying instrument is collimated. In particular, measurement at a distance exceeding about 200 m from the surveying instrument tends to cause an environmental factor due to fluctuation of air etc. and, in contrast, when a distance to a measurement object is a short distance from the surveying instrument, an influence of an observation error on an elevation angle becomes relatively larger. Therefore, a representative value closest to the elevation angle error based on observation at a not-too-far and not-too-close optimum distance of near 100 m is selected from the representative values $\Delta\theta 1$, $\Delta\theta 2$, $\Delta\theta 3$ . . . $\Delta\theta n0$ and is defined as the final representative value to take not only the vertical-axis error detected by the tilt sensor 35 but also the elevation angle error based on observation into consideration.

Therefore, after the calculation of S28(2)-2, a minimum difference value dmin is selected from a plurality of the difference values d at S28(2)-3, and the representative value Δθ of the vertical-axis errors resulting in the minimum difference value dmin from the setting error Δθ0 is determined as the final representative value at S28(2)-4. As is the case with the first embodiment, in comparison with the setting error (vertical-axis error based on observation) Δθ0, the final representative value Δθ larger than the setting error Δθ0 is stored to update the setting error (S28(2)-5, S28(2)-6).

Therefore, in this case, the vertical-axis error taking the elevation angle error based on observation into account can be excluded from the elevation angle detected by the elevation angle measuring part 30, so that the measurement accuracy of the elevation angle can further be increased.

The third embodiment shown in FIG. 10 is a modification example of the error determination process according to the first embodiment. Specifically, at S28(3)-1, a plurality of the representative values Δθ1, Δθ2, Δθ3 . . . Δθn0 of vertical-axis errors is read, and a maximum value Δθmax and a minimum value Δθmin are selected from the plurality of representative values Δθ1, Δθ2, Δθ3 . . . Δθn0 of the vertical-axis errors (S28(3)-2, S28(3)-3). At S28(3)-4, after the maximum value Δθmax and the minimum value Δθmin are excluded from the plurality of the representative values Δθ1, Δθ2, Δθ3 . . . Δθn0 of the vertical-axis errors, an average value Δθav is calculated from the remainder and the average value Δθav is defined as the final representative value Δθ.

As is the case with the first embodiment, in comparison with the setting error Δθ0, the final representative value Δθ (=Δθav) larger than the setting error Δθ0 is stored to update the setting error (S28(3)-5, S28(3)-6).

In this case, since the maximum value Δθmax and the minimum value Δθmin are excluded from the plurality of representative values of the vertical-axis errors, a vertical-axis error not far from the actual state can be acquired.

Although the embodiments have been described, the present invention include the following forms.

(1) To further increase the measurement accuracy of the elevation angle Av, not only a vertical-axis error but also a mechanical error (affecting the elevation angle) of accessories such as a tilt sensor and a protractor plate are detected and canceled from the elevation angle detected by the elevation angle measuring part 30.

(2) The mechanical error affecting the horizontal angle Ah is detected in addition to the elevation angle Av and canceled from the horizontal angle detected by the horizontal angle measuring part 28 so as to increase the measurement accuracy of the horizontal angle.

(3) On the premise of configuration of a surveying instrument at least having an angle measuring part measuring an angle relative to an object to be measured, comprising:

an error detecting part detecting a mechanical error reflected in a measurement angle measured by the angle measuring part; and a correction processing part receiving a measurement angle measured by the angle measuring part and outputting as a measurement angle an angle acquired by cancelling the mechanical error detected by the error detecting part from the measurement angle, the following configurations of (3-1) to (3-4) are achieved.

(3-1) The angle measuring part is an elevation angle measuring part measuring an elevation angle relative to an object to be measured, the error detecting part detects a mechanical error affecting an elevation angle defined as the measurement angle, and the error detecting part detects a vertical-axis error.

According to this configuration, the vertical-axis error can be excluded from the elevation angle by focusing only on the vertical-axis error having the greatest influence on the elevation angle, so that while the configurations of the error detecting part and the correction processing part are simplified, the preciseness can be increased in the elevation angle used as the position information of the object to be measured.

(3-2) The error detecting part is set to detect the mechanical error on the condition that the start switch is activated.

According to this configuration, by utilizing the timing before a measurement work immediately after activation, the mechanical error can properly be detected by the error detecting part.

(3-3) The angle measuring part is an elevation angle measuring part measuring an elevation angle relative to an object to be measured;

the error detecting part detects a mechanical error affecting an elevation angle defined as the measurement angle; and the correction processing part is set to output as an elevation angle an angle acquired by cancelling a setting error from the elevation angle measured by the elevation angle measuring part and is set to update the setting error to the mechanical error detected by the error detecting part if an update determining part determines that the mechanical error detected by the error detecting part is larger than the setting error.

According to this configuration, if the mechanical error detected by the error detecting part exceeds the setting error, the mechanical error can be cancelled from the elevation angle measured by the elevation angle measuring part so as to increase the accuracy of the elevation angle to be output, whereas if the mechanical error detected by the error detecting part is equal to or less than the setting error, the setting error can be cancelled from the elevation angle measured by the elevation angle measuring part so as to increase the accuracy of the elevation angle to be output under a uniform operation, so that the configuration in the correction processing part can be simplified.

Obviously, if the mechanical error detected by the error detecting part is equal to or less than the setting error, the mechanical error detected by the error detecting part is consequently canceled through the cancellation of the setting error from the elevation angle measured by the elevation angle measuring part.

(3-4) A communicating part transmitting an output value from the correction processing part is included.

According to this configuration, a precise measurement angle prevented as much as possible from reflecting the mechanical error can be transmitted and, if movement of a constituent member is controlled in the object to be measured, the accuracy of the control can be increased.

(4) On the premise of configuration of a surveying instrument usage method in which a surveying instrument measures position information of a construction machine and transmits the position information of the construction machine to the construction machine, the method comprising:

preparing as the surveying instrument an instrument including an angle measuring part measuring an angle relative to an object to be measured, an error detecting part detecting a mechanical error reflected in a measurement angle measured by the angle measuring part, a correction processing part receiving a measurement angle measured by the angle measuring part and outputting as a measurement angle an angle acquired by cancelling the mechanical error detected by the error detecting part from the measurement angle, and a communicating part transmitting an output value of the correction processing part to the surveying instrument;

causing the error detecting part to detect the mechanical error before the surveying instrument establishes a relation to the construction machine; and causing the correction processing part to cancel the mechanical error detected by the error detecting part from the measurement angle measured by the angle measuring part and causing the communicating part to transmit an output value of the correction processing part as a measurement angle to the construction machine when the surveying instrument establishes a relation to the construction machine, the following configurations of (4-1) to (4-3) are achieved.

(4-1) The construction machine provides upward/downward movement control of a constituent member in the construction machine, the angle measuring part is caused to measure an elevation angle relative to the construction machine, the error detecting part is caused to detect a mechanical error of the surveying instrument affecting the elevation angle, the correction processing part is caused to output as an elevation angle an angle acquired by cancelling the mechanical error detected by the error detecting part from the elevation angle measured by the angle measuring part, and the error detecting part is caused to detect a vertical-axis error of the surveying instrument.

According to this configuration, since the vertical-axis error having the greatest influence on the elevation angle and most easily detected is detected, the surveying instrument can be simplified while increasing the measurement accuracy.

(4-2) Before establishing a relation to the construction machine, installation position information of the surveying instrument is acquired based on observation of a known point while the error detecting part is caused to detect the mechanical error in synchronization with the observation, the observation of the known point is performed in normal and reverse observations while the error detecting part is caused to detect the mechanical error under each of the normal and reverse observations, and a representative mechanical error is derived from the mechanical errors under the normal and reverse observations to use the representative mechanical error as the mechanical error in the correction processing part.

According to this configuration, since the representative mechanical error is calculated from the mechanical error at the time of a normal posture form and the mechanical error at the time of a reverse posture form, variations of the mechanical error can be suppressed to acquire the mechanical error close to the actual state.

(4-3) Before establishing a relation to the construction machine, installation position information of the surveying instrument is acquired based on observation of a known point while the error detecting part is caused to detect the mechanical error in synchronization with the observation, the known point is one of a plurality of prepared known points, the error detecting part is caused to detect the mechanical error in synchronization with observation of each of the plurality of the known points, and a representative mechanical error is derived from the plurality of the mechanical errors to use the representative mechanical error as the mechanical error in the correction processing part.

According to this configuration, variations of the mechanical error can further be suppressed to acquire the mechanical error closer to the actual state.

What is claimed is:

1. A surveying instrument at least having an angle measuring part measuring an angle relative to an object to be measured, comprising:
    an error detecting part detecting a mechanical error reflected in a measurement angle measured by the angle measuring part;
    a correction processing part receiving a measurement angle measured by the angle measuring part and outputting as a measurement angle an angle acquired by cancelling the mechanical error detected by the error detecting part from the measurement angle;
    a driving part freely changing and adjusting a measurement posture;
    an initial posture instructing part instructing the driving part to sequentially take a normal posture form and a reverse posture form for acquiring installation position information on the condition that a start switch is activated;
    an initial posture determining part determining the normal posture form and the reverse posture form taken based on the instruction from the initial posture instructing part, the initial posture determining part instructing the error detecting part to detect the mechanical error at the time of the normal posture form and at the time of the reverse posture form; and
    an error calculating part calculating a representative mechanical error from a mechanical error at the time of the normal posture form and a mechanical error at the time of the reverse posture form detected by the error detecting part.

2. A surveying instrument at least having an angle measuring part measuring an angle relative to an object to be measured, comprising:
    an error detecting part detecting a mechanical error reflected in a measurement angle measured by the angle measuring part; and
    a correction processing part receiving a measurement angle measured by the angle measuring part and outputting as a measurement angle an angle acquired by cancelling the mechanical error detected by the error detecting part from the measurement angle, wherein
    the correction processing part is set to output as a measurement angle an angle acquired by canceling the setting error from a measurement angle measured by the angle measuring part while the correction processing part is related to an update determining part determining whether a mechanical error detected by the error detecting part is larger than the setting error, and wherein
    the update determining part is set to instruct the correction processing part when determining that a mechanical error detected by the error detecting part is larger than the setting error, so as to make an update such that the mechanical error is set as a new setting error.

3. The surveying instrument according to claim 2, wherein the angle measuring part is an elevation angle measuring part measuring an elevation angle relative to an object to be measured, wherein the error detecting part detects a mechanical error affecting an elevation angle defined as the measurement angle; and wherein the correction processing part is set to output as an elevation angle an angle acquired by cancelling a setting error from the elevation angle measured by the elevation angle measuring part and is set to update the setting error to the mechanical error detected by the error detecting part if an update determining part determines that the mechanical error detected by the error detecting part is larger than the setting error.

4. The surveying instrument according to claim 3, further comprising a communicating part transmitting an output value from the correction processing part.

5. A surveying instrument usage method in which a surveying instrument measures position information of a construction machine and transmits the position information of the construction machine to the construction machine, the method comprising:

preparing as the surveying instrument an instrument including an angle measuring part measuring an angle relative to an object to be measured, an error detecting part detecting a mechanical error reflected in a measurement angle measured by the angle measuring part, a correction processing part receiving a measurement angle measured by the angle measuring part and outputting as a measurement angle an angle acquired by cancelling the mechanical error detected by the error detecting part from the measurement angle, and a communicating part transmitting an output value of the correction processing part to the construction machine;

causing the error detecting part to detect the mechanical error before the surveying instrument establishes a relation to the construction machine; and causing the correction processing part to cancel the mechanical error detected by the error detecting part from the measurement angle measured by the angle measuring part and causing the communicating part to transmit an output value of the correction processing part as a measurement angle to the construction machine when the surveying instrument establishes a relation to the construction machine, wherein the construction machine provides upward/downward movement control of a constituent member in the construction machine, wherein the angle measuring part is caused to measure an elevation angle relative to the construction machine, wherein the error detecting part is caused to detect a mechanical error of the surveying instrument affecting the elevation angle, and wherein the correction processing part is caused to output as an elevation angle an angle acquired by cancelling the mechanical error detected by the error detecting part from the elevation angle measured by the angle measuring part.

6. The surveying instrument usage method according to claim 5, wherein before establishing a relation to the construction machine, installation position information of the surveying instrument is acquired based on observation of a known point while the error detecting part is caused to detect the mechanical error in synchronization with the observation.

7. The surveying instrument usage method according to claim 6, wherein the observation of the known point is performed in normal and reverse observations while the error detecting part is caused to detect the mechanical error under each of the normal and reverse observations, and wherein a representative mechanical error is derived from the mechanical errors under the normal and reverse observations to use the representative mechanical error as the mechanical error in the correction processing part.

8. The surveying instrument usage method according to claim 6, wherein the known point is one of a plurality of prepared known points, wherein the error detecting part is caused to detect the mechanical error in synchronization with observation of each of the plurality of the known points, and wherein a representative mechanical error is derived from the plurality of the mechanical errors to use the representative mechanical error as the mechanical error in the correction processing part.

* * * * *